April 23, 1963 W. L. QUICK 3,086,539
EGG WASHING MACHINE
Filed Nov. 2, 1961 3 Sheets-Sheet 2
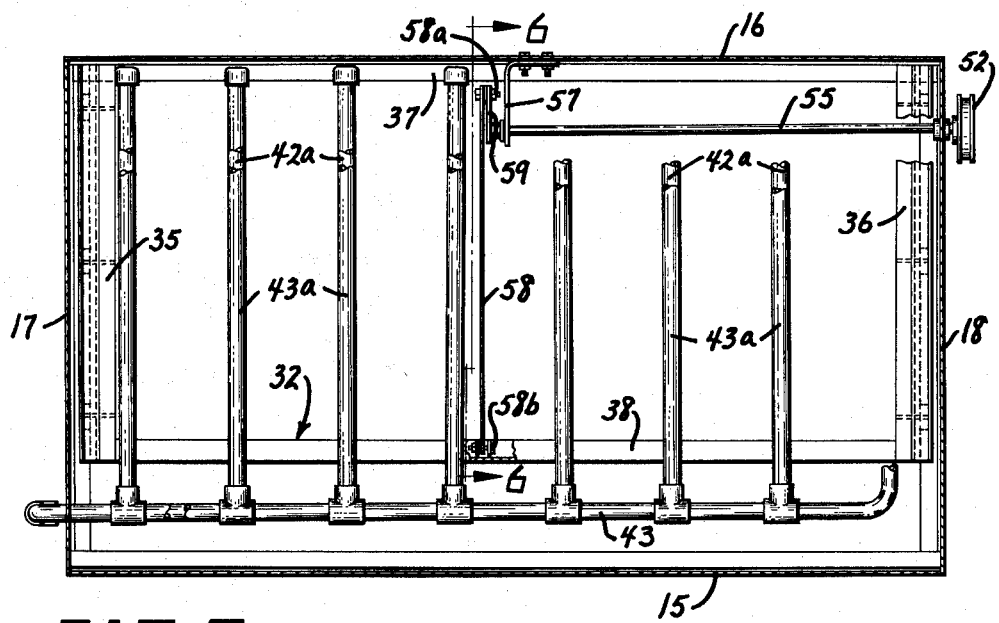
FIG. 3
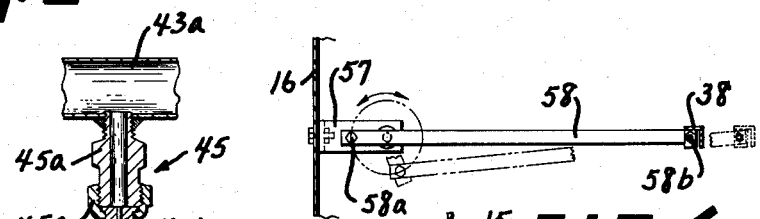
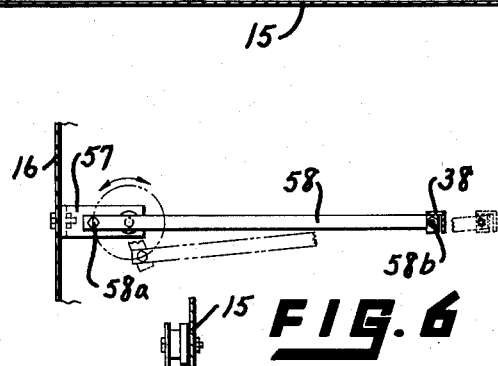
FIG. 5
FIG. 6
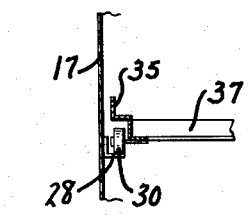
FIG. 4
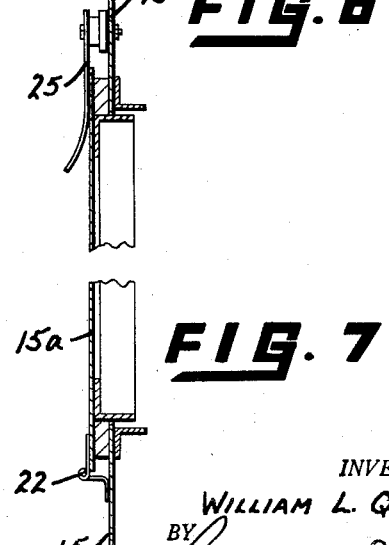
FIG. 7
INVENTOR.
WILLIAM L. QUICK
BY
Attorney

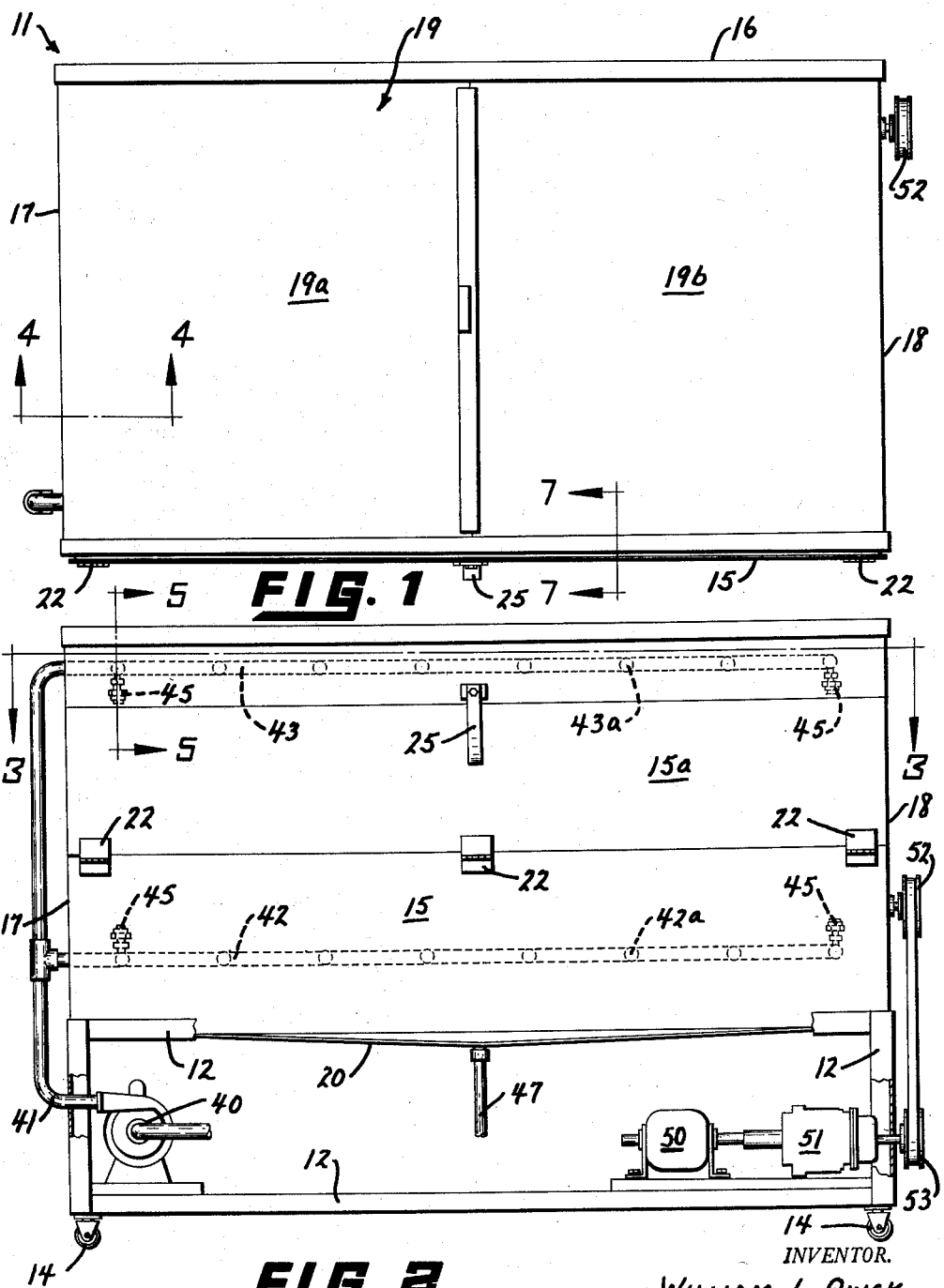

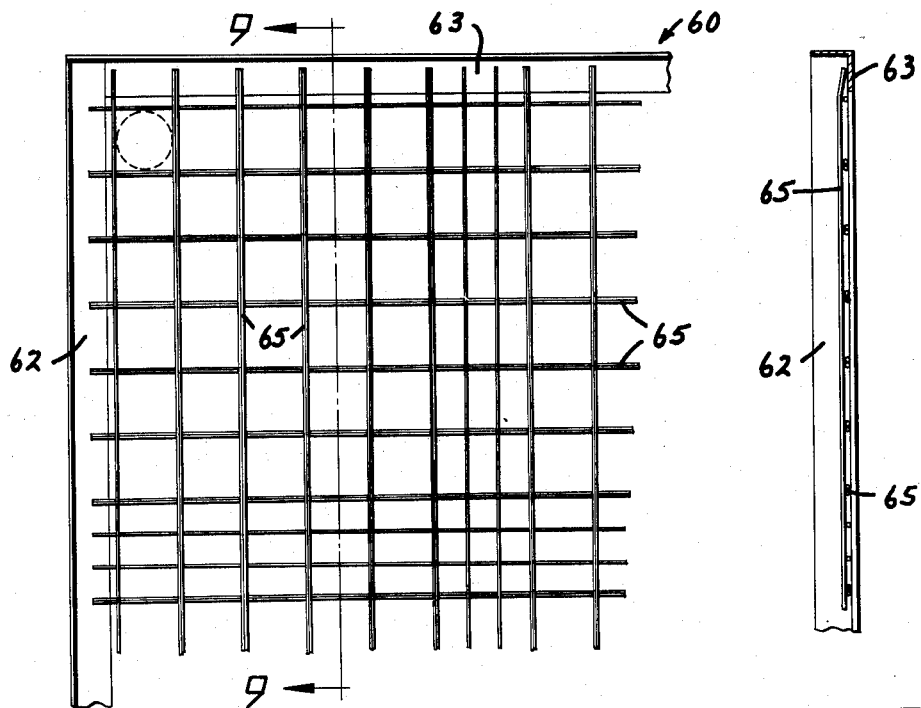
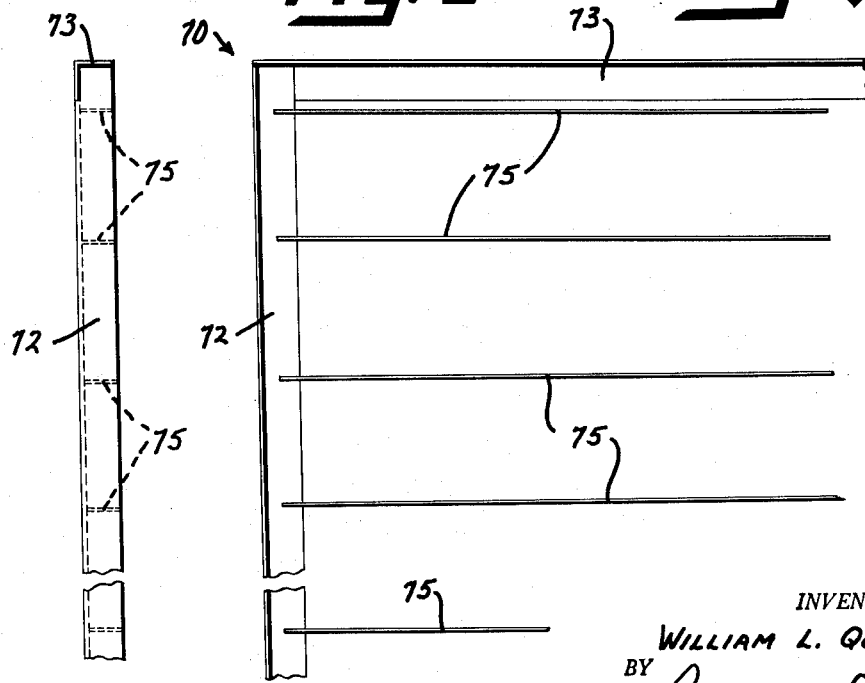

United States Patent Office 3,086,539
Patented Apr. 23, 1963

3,086,539
EGG WASHING MACHINE
William L. Quick, Rte. 5, Boonville, Ind.
Filed Nov. 2, 1961, Ser. No. 149,604
5 Claims. (Cl. 134—165)

The present invention relates to an egg washing machine, and more particularly to a new and improved egg washing machine which effects cleansing action by reciprocating the eggs between sprays of cleaning liquid which are directed to opposite portions thereof.

As is known, the cleansing of eggs plays an important part in their ultimate sale, the procedure generally being such that the eggs are washed after laying and before refrigerating prior to shipment. Egg washing machines in use heretofore are large pieces of equipment representing formidable capital expenditures, and because of the latter, these have been mainly desirable only for the larger egg laying operations. Additionally, the effectiveness of such prior egg washing equipment did not generally permit much or any variation from the inherent operation thereof. In this latter connection, for example, once the eggs were placed in one of these prior machines and washing initiated, it was impossible, or at least more than an easily accomplished task, to remove the eggs for any given reason.

By virtue of the instant invention, the applicant has invented a new and novel egg washing machine which permits the ready placement of eggs, or trays carrying such eggs, therein, in addition to highly effective washing action. The applicant's invention is so designed as to lend its usefulness to large as well as small laying operations. Broadly, the instant egg washing machine comprises a closed compartment in which an egg receiving rack is disposed, where such egg receiving rack is adapted to be reciprocally moved between a series of sprays, so that all surfaces of each egg are effectively washed. Inasmuch as the solution for washing the eggs must typically be at an elevated temperature, heating elements are provided on the machine, and a recirculating pump affords further economies in the reuse of the cleansing solution. Over-all, the applicant's invention represents simplicity in form, as well as in its manufacture.

Accordingly, the principal object of the present invention is to provide a new and novel egg washing machine having a reciprocating egg receiving rack.

Another object of the present invention is to provide a new and novel egg washing machine which includes a series of sprays, each directed at the other, with a rack for the eggs being slidable therebetween.

A further and more general object of the present invention is to provide a self-contained egg washing machine representing a minimum number of components which are readily assembled to provide an economical unit for effective egg washing action independent of the size of the laying operation.

Other objects and a better understanding of the present invention will become more apparent from the following detailed description, taken in conjunction with the accompanying drawings, wherein—

FIG. 1 is a top plan view of an egg washing machine in accordance with the instant invention;

FIG. 2 is a view in front elevation of the egg washing machine of FIG. 1;

FIG. 3 is a view in horizontal section of the applicant's new and novel egg washing machine, taken at line 3—3 of FIG. 2 and looking in the direction of the arrows;

FIG. 4 is a fragmentary view in vertical section of a structural detail of the instant invention, taken at line 4—4 of FIG. 1 and looking in the direction of the arrows;

FIG. 5 is a detailed view in vertical section, taken at line 5—5 of FIG. 2 and looking in the direction of the arrows, showing a typical spray nozzle forming part of the applicant's egg washing machine;

FIG. 6 is a fragmentary view, taken at line 6—6 of FIG. 3 and looking in the direction of the arrows, of the power control system, and its range of movement, in accordance with the present invention;

FIG. 7 is a fragmentary view in vertical section, taken at line 7—7 of FIG. 1 and looking in the direction of the arrows, showing still further structural details of the instant egg washing machine.

FIG. 8 is a fragmentary plan view of a typical egg receiving tray used in combination with applicant's new and novel egg washing machine;

FIG. 9 is a view in vertical section of the egg receiving tray of FIG. 8, taken at line 9—9 of such figure and looking in the direction of the arrows;

FIG. 10 is a fragmentary top plan view of another type of egg receiving tray; and FIG. 11 is a view in end elevation of the egg receiving tray of FIG. 10.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1, 2 and 3, the applicant's new and novel egg washing machine comprises a closed watertight compartment 11 supported on a rigid framework 12, where the latter may include supporting wheels 14 to provide portability. The compartment 11 is defined by a front wall 15, a rear wall 16, side walls 17 and 18, a top wall 19 and a bottom wall 20, where, more specifically, the top wall 19 comprises two portions 19a and 19b, one being slidable with respect to another to permit entry into the egg washing machine. Additionally, the front wall 15 includes a movable door portion 15a supported at hinges 22, where the movable door portion 15a is typically retained in a position for normal operation of the machine by a swivel type locking device 25 (see FIG. 7). It should be noted that the bottom wall 20 of the machine bows downwardly, for reasons which will become more apparent from the following discussion.

Disposed along the inner surfaces of the side walls 17 and 18 are channel members 28 which are adapted to receive wheels 30 of a movable egg receiving rack 32 (see FIGS. 3 and 4), where the latter typically comprises a framework defined by upstanding flanges 35 and 36 which, when in use, lie proximate each of the inside surfaces of the side walls 17 and 18 of the egg washing machine, and where a back flange 37 and a front flange 38 complete the assembly. It should be understood that several of the wheels 30 are typically mounted along each of the sides of the movable egg receiving rack 32, and that the upstanding flanges defining the framework thereof receive trays for the eggs being processed, the latter to be described in connection with FIGS. 8, 9, 10 and 11 of the drawings. In any event, the egg receiving rack 32 is smaller in its front-to-back dimension than the front-to-back dimension of the egg washing machine, so that space is provided to permit its reciprocal movement, as will be apparent from the discussion herebelow.

The instant egg washing machine further comprises a circulation system for the egg cleansing solution, which circulation system is defined by a motor-driven pump 40 to which a conduit 41 is connected, where, at a joint thereof, one conduit 42 enters the egg washing machine at a position below the egg receiving rack 32, while another conduit 43 enters the egg washing machine at a position above the egg receiving rack 32. In any event, and as should be apparent from FIG. 3, each of the conduits 42 and 43 further includes a system of general parallel conduits 42a and 43a, each having spray nozzles 45 spaced therealong. The spray nozzles 45, as more particularly disclosed in FIG. 5, extend downwardly from the conduits 43a of the circulation system, and upwardly from the conduits 42a of the circulation system (see FIG. 2).

Each of the spray nozzles is of a type commonly known in the art, and typically includes a base portion 45a secured to the respective conduits, and a spray element 45b positioned at one end of the base portion 45a and retained thereon by threaded means 45c. To permit the recirculation and, hence, reuse of the egg cleansing solution, or, alternatively, the disposal thereof, a conduit 47 is provided on the bowed bottom of the bottom wall 20 of the machine, and connections (not shown) either connect such drain conduit 47 to an outside sump or to the motor-driven pump 40.

The egg receiving rack 32 is reciprocally moved along the channel members 28 on the inside surfaces of the side walls 17 and 18 of the egg washing machine through a power arrangement typically defined by a conventional power source 50, a speed reducing unit 51, and a belt and pulley arrangement including an upper pulley 52 and lower pulley 53, where the upper pulley 52 has a shaft 55 secured thereto which rotates as the upper pulley 52 rotates (see FIGS. 3 and 6). A bracket 57 positions one end of the aforesaid shaft 55 in the machine, where a linkage 59, fixedly secured to the shaft 55, extends between the shaft 55 and a control rod 58 which is pivotably connected to such linkage 59, at 58a, and to the front flange 38 of the egg receiving rack 32, at 58b.

When used, and as should be evident from FIG. 6, with the rotation of the shaft 55, the linkage 59 also rotates, causing the control rod 58 to reciprocate towards and away from the front of the machine, where the full line representation of FIG. 6 typically shows one position of the egg receiving rack 32, i.e. when it is close to the rear wall 16 of the machine, while the broken line representation in the same figure shows a typical position of the egg receiving rack 32 towards the front wall 15 of the machine.

FIGS. 8, 9, 10 and 11 are directed to types of trays which may be used in combination with the egg receiving rack 32 of the preceding figures. For example, and with reference first to FIGS. 8 and 9, an egg tray 60 is disclosed therein which typically comprises a framework defined by flanges 62 and 63, where wires 65, typically coated with rubber, define a latticework area where the eggs are received and supported. By way of example of usage, an egg (shown in broken lines) is shown in a cleaning position in FIG. 8.

FIGS. 10 and 11 show an alternate egg tray 70 which is defined by flanges 72 and 73 forming a framework, but, in this instance, a series of spaced-apart generally parallel elements 75 extend from one side of the tray to another, where portable egg receiving members (not shown) are adapted to be placed on the aforesaid elements. In any event, either with the tray 60 of FIGS. 8 and 9, or with the tray 70 of FIGS. 10 and 11, an equivalent number of eggs is adapted to be processed during each cleaning operation.

In use, the eggs which are to be cleaned are placed on an egg tray, which may be one of the general types discussed hereabove, where the loaded egg tray is then positioned on the egg receiving rack 32, after, of course, the movable door portion 15a of the front wall 15 has been opened to provide entry thereto. It should be noted that the backward and sideward movement of the egg tray on the egg receiving rack 32 is limited by the upstanding portions of the flanges 35, 36 and 37. In any event, the door portion 15a is then closed and the locking device 22 moved into the position disclosed by FIGS. 2 and 6. In view of the use of gaskets or like sealing members disposed around the hinged movable door portion 15a, as well as the movable portions 19a and 19b (not shown) of the top wall 19, the compartment 11 of the instant egg washing machine is maintained watertight.

A typical operational procedure thereafter is the energization of the power source 50, so that the egg receiving rack 32 reciprocates in the manner discussed hereabove. At this time, the motor-driven pump 40 is caused to operate and the egg cleansing solution flows from its source (not shown) through the circulation system, also in the manner discussed hereabove. It might be noted that as it is generally desirable to use the egg cleansing solution in a heated condition, the instant egg washing machine also includes heater elements (not shown) which serve such purpose.

At this point of operation, it should be apparent that with the egg cleansing solution being circulated, sprays thereof are being forced from the spray nozzles 45, either onto the top surface portions of the eggs, or onto the bottom surface portions of the eggs, to permit the thorough cleansing of the eggs during the washing period. As indicated hereabove, the egg cleansing solution may be recirculated until the operator determines that the replacement thereof is necessary.

From the preceding, it should be apparent that the applicant has provided a new and novel egg washing machine which, through reciprocating action, provides for effective washing of all surfaces of an egg, in that the eggs are caused to be washed by being passed through sprays of egg cleansing solution which are directed onto the top and bottom portions thereof. Through variations of the speed reducing unit 51, the rate of reciprocation may be changed, and, additionally, the over-all cleaning period controlled, as desired. The instant invention permits quick access to the eggs after washing, as well as provides an over-all unit which is representative of considerable economies to the user, without the sacrifice of end efficiencies.

It should be understood that the egg washing machine described hereabove is susceptible to various changes within the spirit of the invention. For example, the various components defining the power arrangement may be modified, in detail, in order to attain the desired reciprocatory effect. Thus, the above description should be considered illustrative, and not as limiting the scope of the following claims.

I claim:

1. An egg washing machine comprising, in combination, a framework, a first and a second spray means disposed on said framework, a rack slidably mounted on said framework between said first and said second spray means, an egg receiving member slidably positioned on said rack, and means reciprocating said rack within a pre-selected range of positions.

2. An egg washing machine comprising, in combination, a framework, a rack slidably mounted on said framework, an egg receiving member slidably positioned on said rack, spraying means disposed proximate said egg receiving member for directing spray thereon, a power source, a control rod pivotably connecting said rack, and a power transfer interconnecting said power source and said control rod to reciprocate said rack between a first position and a second position, said power transfer defined by a belt and pulley arrangement, a shaft fixedly secured to one pulley of said belt and pulley arrangement, and a linkage having one end fixedly secured to said shaft and another end pivotably secured to said control rod.

3. An egg washing machine comprising, in combination, a framework defining a closed compartment, a rack slidably mounted on said framework within said closed compartment, an egg receiving member slidably positioned on said rack, spraying means disposed within said compartment proximate said egg receiving member for directing spray thereon, and means reciprocating said rack between a first and a second position.

4. The egg washing machine of claim 3 where said egg receiving member is defined by a framework having egg supporting elements disposed in a latticework pattern thereon.

5. The egg washing machine of claim 3 where said egg receiving member is defined by a framework having a series of parallel support elements extending between opposite portions thereof, and where said support elements are adapted to receive removable egg trays.

References Cited in the file of this patent

UNITED STATES PATENTS

| | | |
|---|---|---|
| 892,104 | Whelan | June 30, 1908 |
| 2,580,800 | Lavender | Jan. 1, 1952 |
| 2,600,467 | Bowler | June 17, 1952 |
| 2,655,164 | Lyman | Oct. 13, 1953 |